United States Patent
Nishioka et al.

(10) Patent No.: US 10,782,789 B2
(45) Date of Patent: Sep. 22, 2020

(54) INPUT DEVICE

(71) Applicant: Funai Electric Co., Ltd., Daito, Osaka (JP)

(72) Inventors: Ken Nishioka, Osaka (JP); Toshiki Hatori, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 280 days.

(21) Appl. No.: 15/332,324

(22) Filed: Oct. 24, 2016

(65) Prior Publication Data

US 2017/0115741 A1   Apr. 27, 2017

(30) Foreign Application Priority Data

Oct. 26, 2015 (JP) .................................. 2015-209919

(51) Int. Cl.
*G06F 3/01* (2006.01)
*G06F 3/042* (2006.01)
(Continued)

(52) U.S. Cl.
CPC ............ *G06F 3/017* (2013.01); *G06F 3/0304* (2013.01); *G06F 3/0423* (2013.01);
(Continued)

(58) Field of Classification Search
CPC ...... G06F 3/017; G06F 3/0304; G06F 3/0423; G06F 3/04815; G06F 3/04817;
(Continued)

(56) References Cited

U.S. PATENT DOCUMENTS

2004/0021643 A1* 2/2004 Hoshino ................. G06F 3/016
345/173
2004/0104894 A1* 6/2004 Tsukada ................ G06F 1/1616
345/168
(Continued)

FOREIGN PATENT DOCUMENTS

CN   102576288 A   7/2012
CN   104185979 A   12/2014
(Continued)

OTHER PUBLICATIONS

Extended European Search Report of the corresponding European Application No. 16 195 307.0, dated Mar. 17, 2017.

*Primary Examiner* — Lunyi Lao
*Assistant Examiner* — Jarurat Suteerawongsa
(74) *Attorney, Agent, or Firm* — Global IP Counselors, LLP

(57) ABSTRACT

An input device is provided that comprises a display component, a detector, and a controller. The display component displays an image. The detector detects a first motion and a second motion. In the first motion, a pointer is slid over a first operation screen that lies in an imaginary plane including at least part of a spatial image that is a virtual image of the image formed in space. In the second motion, the pointer is moved into a second operation screen that lies in the imaginary plane and is different from the first operation screen. The controller executes a first operation to select the image when the first motion is detected, and executes a second operation to execute content of the selected image when the second motion is detected.

20 Claims, 9 Drawing Sheets

(51) Int. Cl.
 *G06F 3/0483* (2013.01)
 *G06F 3/0481* (2013.01)
 *G06F 3/03* (2006.01)
 *G06F 3/0484* (2013.01)
 *G09G 3/00* (2006.01)

(52) U.S. Cl.
 CPC ........ *G06F 3/0483* (2013.01); *G06F 3/04815* (2013.01); *G06F 3/04817* (2013.01); *G06F 3/04842* (2013.01); *G06F 3/04845* (2013.01); *G09G 3/003* (2013.01)

(58) Field of Classification Search
 CPC .............. G06F 3/0483; G06F 3/04842; G06F 3/04845; G06F 3/01; G09G 3/003; G09G 3/00
 See application file for complete search history.

(56) References Cited

U.S. PATENT DOCUMENTS

| | | | | |
|---|---|---|---|---|
| 2006/0022955 | A1* | 2/2006 | Kennedy | G06F 3/0414 345/173 |
| 2007/0273669 | A1* | 11/2007 | Park | G06F 3/04883 345/173 |
| 2009/0077504 | A1* | 3/2009 | Bell | G06F 3/011 715/863 |
| 2009/0282332 | A1* | 11/2009 | Porat | G06F 3/0482 715/702 |
| 2011/0083104 | A1* | 4/2011 | Minton | G06F 3/04886 715/815 |
| 2013/0335303 | A1* | 12/2013 | Maciocci | G06F 3/011 345/8 |
| 2014/0229888 | A1* | 8/2014 | Ko | G06F 3/04842 715/783 |
| 2014/0300584 | A1* | 10/2014 | Nishioka | G06F 3/0421 345/175 |
| 2014/0365928 | A1* | 12/2014 | Boelter | G06F 3/04883 715/765 |
| 2015/0033162 | A1* | 1/2015 | Hiro | H04M 1/72583 715/765 |
| 2015/0288883 | A1 | 10/2015 | Shigeta | |
| 2018/0275864 | A1* | 9/2018 | Kurabayashi | G06F 3/0488 |

FOREIGN PATENT DOCUMENTS

| | | |
|---|---|---|
| CN | 104335142 A | 2/2015 |
| EP | 2790049 A1 | 10/2014 |
| WO | 2008-123500 A1 | 10/2008 |
| WO | 2009-035705 A1 | 3/2009 |

\* cited by examiner

INPUT DEVICE

CROSS-REFERENCE TO RELATED APPLICATIONS

This application claims priority to Japanese Patent Application No. 2015-209919 filed on Oct. 26, 2016. The entire disclosure of Japanese Patent Application No. 2015-209919 is hereby incorporated herein by reference.

BACKGROUND

Field of the Invention

This invention generally relates to an input device. More specifically, the present invention relates to an input device that is used as a virtual user interface (VUI).

Background Information

There is, for example, a known input device used as a VUI for operating an apparatus, etc. In one example of such an input device, a spatial image (virtual image) is formed in an imaginary plane disposed in space, and the motion of a pointer (such as a user's hand) with respect to this spatial image is detected (see International Publication No. 2008/123500 (Patent Literature 1), for example).

With a conventional input device, the pointer is slid over the spatial image, for example, to execute an operation that moves a cursor displayed in the spatial image to track the movement of the pointer. When the movement of the pointer stops on an icon displayed in the spatial image, the cursor is superposed over that icon.

From a state in which the cursor is superposed over the icon, the pointer is pushed in the depth direction of the icon (the direction of going through the imaginary plane), and this executes an operation of selecting that icon. At this point, the amount of change in the pointer in the depth direction of the spatial coordinates is sensed, and operation to select the icon is executed based on the sensed amount of change.

SUMMARY

With the conventional input device discussed above, when the pointer is being slid over the spatial image, shaking of the user's hand can sometimes cause the pointer to move in the depth direction. If this happens, an operation to select that icon may end up being executed against the wishes the user. Thus, operation cannot necessarily be considered easy.

One object is to provide an input device with which operation is easier.

An input device is provided that comprises a display component, a detector, and a controller. The display component displays an image. The detector detects a first motion and a second motion. In the first motion, a pointer is slid over a first operation screen that lies in an imaginary plane including at least part of a spatial image that is a virtual image of the image formed in space. In the second motion, the pointer is moved into a second operation screen that lies in the imaginary plane and is different from the first operation screen. The controller executes a first operation to select the image when the first motion is detected, and executes a second operation to execute content of the selected image when the second motion is detected.

BRIEF DESCRIPTION OF THE DRAWINGS

Referring now to the attached drawings which form a part of this original disclosure.

DETAILED DESCRIPTION OF EMBODIMENTS

Selected Embodiments of the present invention will now be described in detail through reference to the drawings. The embodiments described below are all comprehensive or specific examples. The numerical values, shapes, materials, constituent elements, layout positions and connection modes of the constituent elements, steps, order of the steps, and so forth in the embodiments given below are just examples, and are not intended to limit the scope of the present invention. Also, of the constituent elements in the following embodiments, those not mentioned in an independent claim will be described as optional constituent elements.

First Embodiment 1-1. Overall Configuration of Input Device

Figure 1:
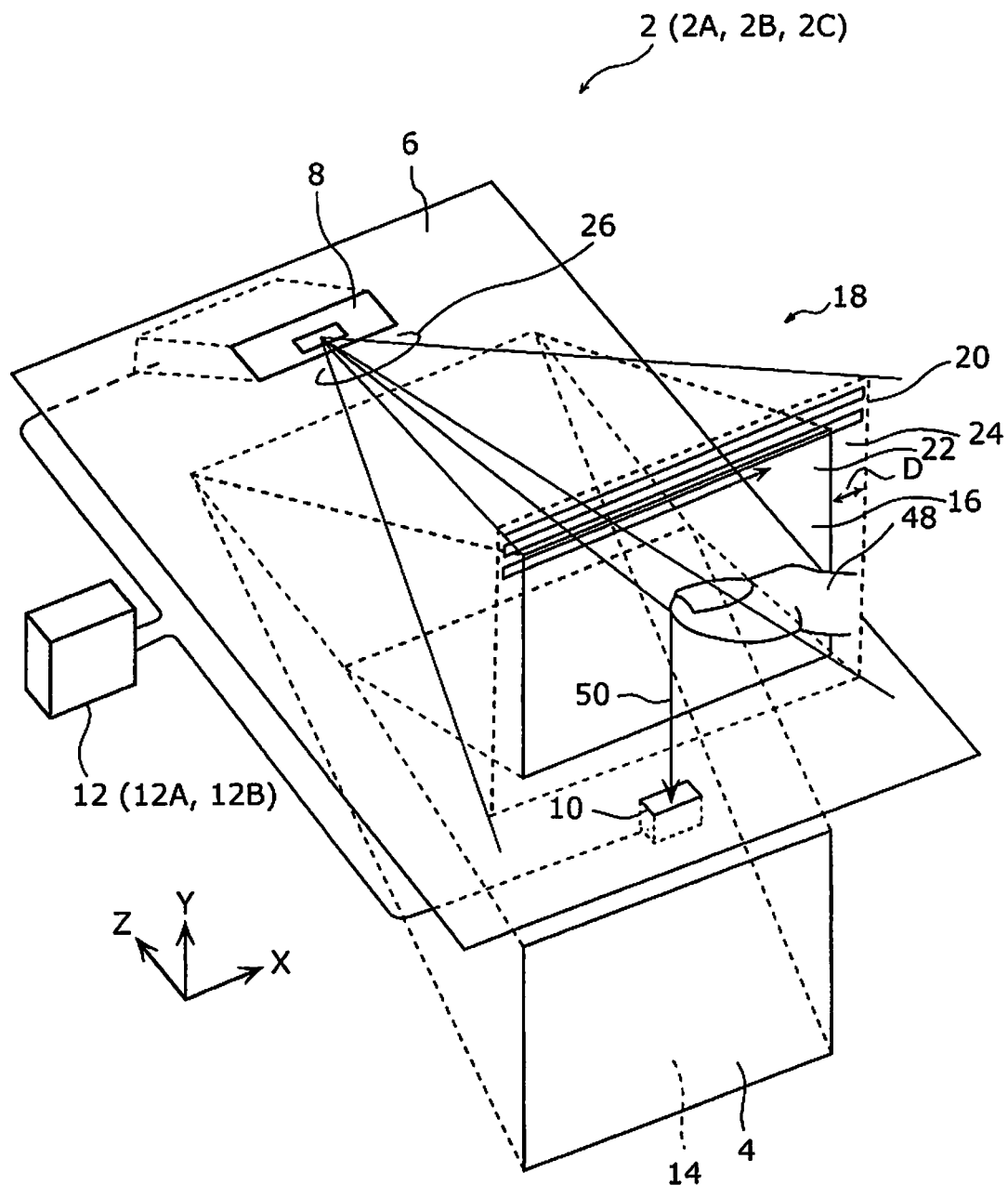
FIG. 1 is a perspective view of the configuration of an input device pertaining to first to fourth embodiments.
Figure 2:
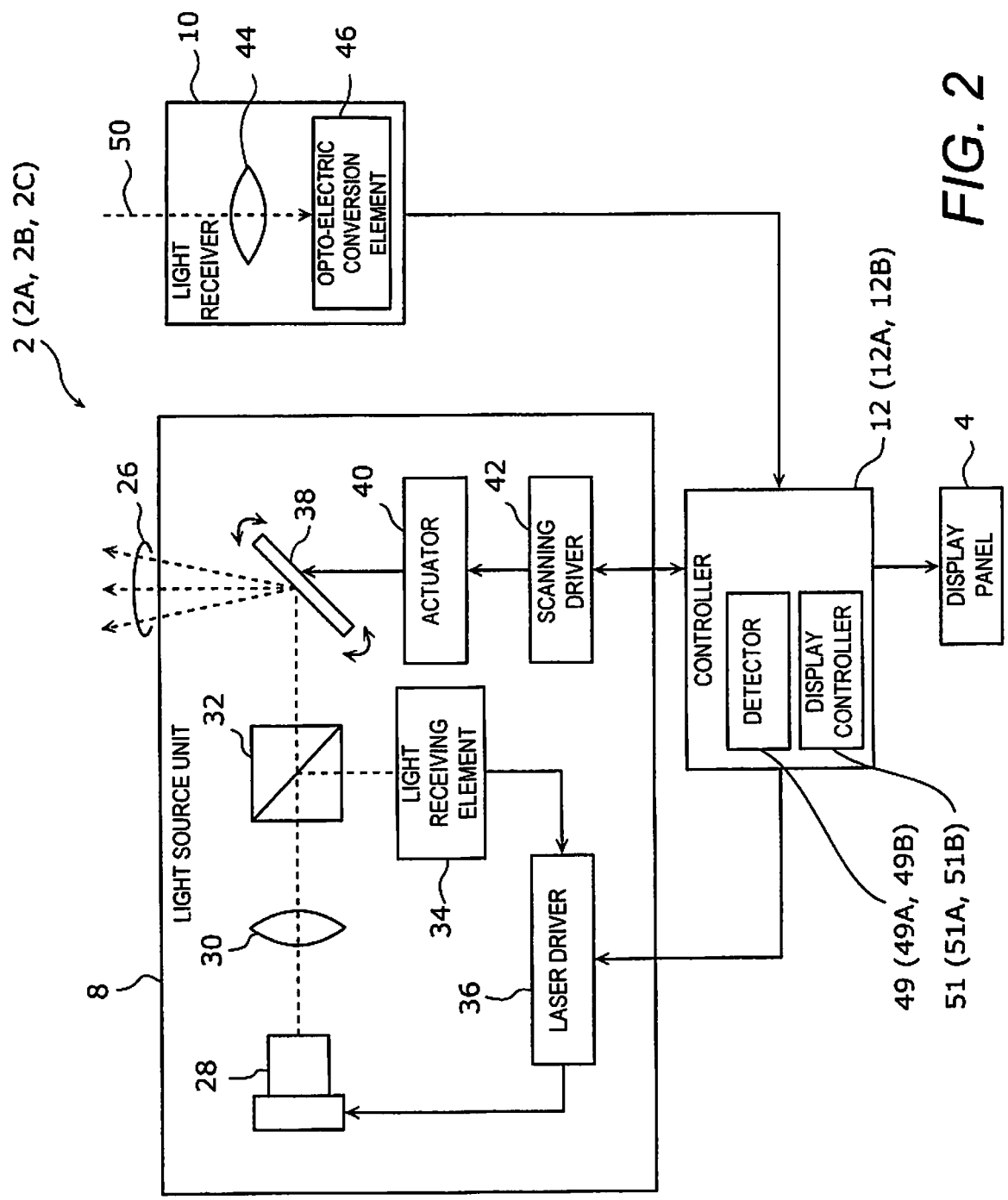
FIG. 2 is a block diagram of the functional configuration of the input device pertaining to the first to the fourth embodiments.

First, the overall configuration of an input device 2 pertaining to a first embodiment will be described through reference to FIGS. 1 and 2. FIG. 1 is a perspective view of the configuration of the input device 2 pertaining to the first embodiment. FIG. 2 is a block diagram of the functional configuration of the input device 2 pertaining to the first embodiment.

As shown in FIGS. 1 and 2, the input device 2 pertaining to the first embodiment comprises a display panel 4 (an example of a display component), a reflector plate 6, a light source unit 8, a light receiver 10, and a controller 12. This input device 2 is used as a virtual user interface (VUI) for operating an apparatus or the like, for example. In FIG. 1, an outer casing (not shown) is omitted of for the sake of better illustrating the inside configuration of the input device 2. However, an outer casing that houses and supports the display panel 4, the reflector plate 6, the light source unit 8, the light receiver 10, and the controller 12 therewithin can be provided as needed and/or desired. Also, as well known in the art, the outer casing can be provided with an opening through which a spatial image 16 (described below) can be seen.

As shown in FIG. 1, the display panel 4 is a rectangular panel for displaying an image 14. The display panel 4 includes a liquid crystal display panel, for example. The display panel 4 is disposed in an orientation that is substantially perpendicular to the reflector plate 6. Of course, the display panel 4 can be different types of display conventionally used in the art.

As shown in FIG. 1, the reflector plate 6 is an optical element used for making the image 14 displayed on the display panel 4 float or project in space as the spatial image 16. The reflector plate 6 includes a reflective element aggregate board (called a dihedral corner reflector array), a lens array, a concave mirror, or the like, for example. More specifically, the reflector plate 6 reflects the image 14 displayed on the display panel 4, thereby forming the spatial image 16. The spatial image 16 is a virtual image of the image 14, and formed in an imaginary plane 20 that is disposed in a space 18. This spatial image 16 that is floating in space is displayed to the user. Thus, the reflector plate 6 is an optical element configured to form the spatial image 16 of the displayed image 14 displayed on the display panel 4.

The imaginary plane 20 is a plane (X-Y plane) disposed virtually in the space 18 on the opposite side from the display panel 4 with respect to the reflector plate 6. The spatial image 16 is a reversal image in which the depth of the image 14 displayed on the display panel 4 is reversed. The spatial image 16 is formed at a position that is symmetrical to the display panel 4 with respect to the reflector plate 6.

As shown in FIG. 1, a first operation screen 22 and a second operation screen 24 are defined on the imaginary plane 20. The first operation screen 22 is a rectangular region for displaying the spatial image 16 and detecting a first motion by the user (discussed below). The first operation screen 22 is disposed to include the entire spatial image 16. In the example shown in FIG. 1, the boundary between the first operation screen 22 and the second operation screen 24 coincides with the outline of the spatial image 16. The second operation screen 24 is a rectangular frame-shaped region for detecting a second motion by the user (discussed below). The second operation screen 24 is disposed all the way around the outside of the first operation screen 22 (that is, on the outside of the spatial image 16). Specifically, the second operation screen 24 is disposed along the entire periphery of the first operation screen 22. The width D of the second operation screen 24 (that is, the distance between the inner and outer peripheries of the second operation screen 24) is set to be greater than the thickness of one finger of the user's hand, and to be less than the overall size (width) of the user's hand.

As shown in FIG. 1, the light source unit 8 is a unit for performing a raster scan with detection light 26 (such as an infrared laser beam) over the entire first operation screen 22 and second operation screen 24 in the imaginary plane 20. As shown in FIG. 2, the light source unit 8 has an infrared laser element 28, a collimating lens 30, a beam splitter 32, a light receiving element 34, a laser driver 36, a scanning mirror 38, an actuator 40, and a scanning driver 42. Thus, in the illustrated embodiment, the light source unit 8 is configured to scan over the first operation screen 22 and the second operation screen 24 with the detection light 26 (light).

The infrared laser element 28 emits an infrared laser beam as the detection light 26. The collimating lens 30 converts the detection light 26 coming from the infrared laser element 28 from scattered light into parallel light. The beam splitter 32 transmits part of the detection light 26 from the collimating lens 30. The beam splitter 32 reflects the rest of the detection light 26 from the collimating lens 30.

The light receiving element 34 receives the detection light 26 reflected by the beam splitter 32. The light receiving element 34 generates a light reception signal indicating the intensity of the received detection light 26. The laser driver 36 drives the infrared laser element 28 under the control of the controller 12. More specifically, the laser driver 36 drives the infrared laser element 28 based on the light reception signal generated by the light receiving element 34, so that the detection light 26 from the infrared laser element 28 will have the specified intensity.

The scanning mirror 38 is, for example, a MEMS (microelectromechanical system) mirror. The scanning mirror 38 reflects the detection light 26 transmitted by the beam splitter 32. The actuator 40 pivots the scanning mirror 38 in the X axis direction and the Y axis direction (see FIG. 1). The scanning driver 42 drives the actuator 40 under the control of the controller 12. More specifically, the scanning driver 42 drives the actuator 40 so that the scanning mirror 38 will have a specific oscillation frequency and oscillation width. As shown in FIG. 1, when the scanning mirror 38 oscillates, the detection light 26 reflected by the scanning mirror 38 makes a raster scan over the entire region of the first operation screen 22 and second operation screen 24. This raster scan is made up, for example, of a main scan in which the detection light 26 scans in the X axis direction with respect to the imaginary plane 20, and a sub-scan in which the detection light 26 scans in the Y axis direction with respect to the imaginary plane 20.

The light receiver 10 receive the reflected light 50 of the raster-scanned detection light 26 reflected by a pointer 48 (see FIG. 1). Specifically, the light receiver 10 has a converging lens 44 and an opto-electric conversion element 46. The converging lens 44 converges reflected light 50, produced when the raster-scanned detection light 26 is reflected by a pointer 48 (see FIG. 1), on the opto-electric conversion element 46. The opto-electric conversion element 46 converts the reflected light 50 from the converging lens 44 from an optical signal into an electrical signal. The electrical signal from the opto-electric conversion element 46 is outputted to the controller 12. In the first embodiment, the pointer 48 is the user's hard (index finger), but this is not the only option. The pointer 48 can instead be a pen or the like that is moved while being held in the user's hand, for example. In the illustrated embodiment, the light receiver 10 is configured and arranged to receive the reflected light 50 that is reflected by the pointer 48 while the pointer 48 is located in the imaginary plane 20 (the first operation screen 22 and the second operation screen 24). With this arrangement, the light receiver 10 can receive the reflected light 50 from the pointer 48 while the pointer 48 touches or intersects the imaginary plane 20 (the first operation screen 22 and the second operation screen 24). In other words, in the illustrated embodiment, the position of the pointer 48 along the Z axis away from the imaginary plane 20 does not need to be detected as long as the pointer 48 on the imaginary plane 20 can be detected. However, of course, the input device 2 can be configured such that the position of the pointer 48 away from the imaginary plane 20 along the Z axis can be detected. Also, in the illustrated embodiment, the imaginary plane 20 is defined as a plane on which the spatial image 16 of the image 14 is formed. The first operation screen 22 and second operation screen 24 are defined as a scanned region of the imaginary plane 20 over which the detection light 26 scans or irradiates. Also, the first operation screen 22 is set as part of the scanned region, while the second operation screen 24 is set as part of the scanned region other than the first operation screen 22. In particular, in the illustrated embodiment, the position of the first operation screen 22 is set to coincide with the position of the spatial image 16.

The controller 12 is used to control the display panel 4, the laser driver 36, the scanning driver 42, and so forth. For example, the controller 12 is made up of a CPU (central processing unit) or any other processor, or made up of a computer system made up of a CPU (central processing unit), a RAM (random access memory), a ROM (read only memory), etc. Some or all of the functions of the controller 12 are realized by executing programs stored in the ROM, with the CPU using the RAM as a working memory. Furthermore, some or all of the functions of the controller 12 can be realized by a dedicated hardware circuit.

The controller 12 has a detector 49 and a display controller 51 (an example of a controller). The detector 49 is configured to detect position of the pointer 48 in the imaginary plane 20. Specifically, the detector 49 calculates information about the position of the pointer 48 in the first operation screen 22 (such as the X-Y planar coordinates) based on the timing at which the reflected light 50 is received by the light receiver 10 and the timing at which the detection light 26 is emitted from the infrared laser element 28. Specifically, the detector 49 is configured to detect the position of the pointer 48 in the imaginary plane 20 based on a scanning position (the position of the raster scan) of the light source unit 8 at a light receiving timing of the light receiver 10. In particular, the position of the pointer 48 is calculated by determining the position of the raster scan of the detection light 26 at the timing of receiving the reflected light 50, for example. The calculation method of the position based on these timings are known in the art, and thus the detailed description will be omitted for the sake of brevity. The detector 49 detects a first motion by the user based on this calculated position information. The first motion is a motion in which the pointer 48 is slid over the first operation screen 22 in a state of being in contact with or inserted into (intersected by) the first operation screen 22 in the imaginary plane 20.

Further, the detector 49 calculates information about the position of the pointer 48 in the second operation screen 24 (such as the X-Y planar coordinates) based on the timing at which the reflected light 50 is received by the light receiver 10 and the timing at which the detection light 26 is emitted from the infrared laser element 28. The detector 49 detects a second motion by the user based on this calculated position information. The second motion is a motion in which the pointer 48 pushes into the second operation screen 24 in the depth direction in the imaginary plane 20 (that is, in the direction of going through the imaginary plane 20). In this Specification, "push in" encompasses not only the motion of the pointer 48 passing through (intersecting) the second operation screen 24 in the depth direction, but also that of the pointer 48 coming into contact with the second operation screen 24. Thus, in the illustrated embodiment, the detector 49 is configured to detect the first motion and the second motion based on the detected position of the pointer 48.

Furthermore, the detector 49 calculates information about the position of the pointer 48 in the first operation screen 22 and the second operation screen 24 (such as the X-Y planar coordinates) based on the timing at which the reflected light 50 is received by the light receiver 10 and the timing at which the detection light 26 is emitted from the infrared laser element 28. The detector 49 detects a third motion by the user based on this calculated position information. The third motion is a motion in which the pointer 48 moves away from the first operation screen 22 in the imaginary plane 20 (that is, the negative direction along the Z axis). Specifically, the third motion is a motion in which the pointer 48 that has been inserted into the first operation screen 22 in the imaginary plane 20 is pulled out from the first operation screen 22.

Figure 4:
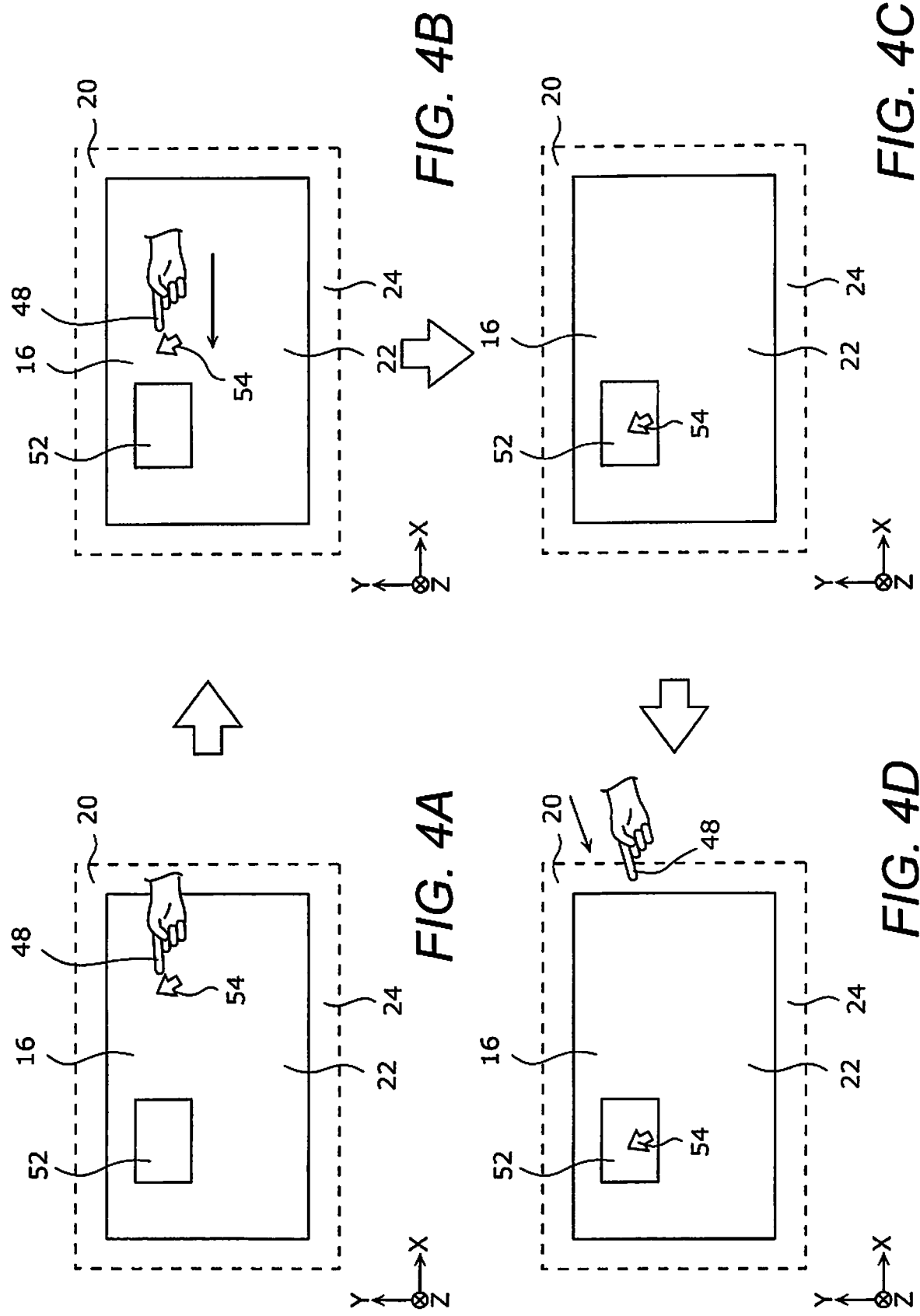
FIGS. 4A, 4B, 4C and 4D are diagrams showing the flow of the operation of the input device pertaining to the first embodiment.

The display controller 51 controls the display content of the image 14 displayed on the display panel 4 (that is, the display content of the spatial image 16) based on the detection result by the detector 49. More specifically, when the detector 49 detects the first motion, the display controller 51 executes a first operation associated with the spatial image 16. As shown in FIG. 4B (discussed below), the first operation involves an operation to select an icon 52 (an example of content) on the spatial image 16 by moving a cursor 54 over the spatial image 16 so as to track the movement of the pointer 48. In the illustrated embodiment, the selection of the icon 52 in the first operation can mean placing the cursor 54 over the icon 52. Thus, in the illustrated embodiment, the display panel 4 displays the image 14 including the icon 52.

Also, when the detector 49 detects the second motion, the display controller 51 executes a second operation that is associated with the spatial image 16. As shown in FIG. 4D (discussed below), the second operation is an operation to execute the icon 52 on the spatial image 16 over which the cursor 54 is superposed (that is, which has been selected). The "content" here is an object of operation on the spatial image 16, such as the icon 52. Also, in the illustrated embodiment, the execution of the icon 52 in the second operation can mean executing an application associated with the icon 52.

When the detector 49 has detected the third motion, the display controller 51 executes a third operation that is associated with the spatial image 16. The third operation is an operation to confirm the selection of the icon 52 on the spatial image 16 over which the cursor 54 is superposed. In particular, when the pointer 48 is pulled out from the first operation screen 22 while maintaining the position (e.g., the X-Y planar coordinates) of the pointer 48 on the icon 52 in the first operation screen 22 after the first operation, then the controller 51 keeps selecting the icon 52 until the second operation is executed or the selection of the icon 52 is canceled. For example, the selection of the icon 52 can be canceled when the pointer 48 is detected in the first operation screen 22 after the third operation.

1-2. Operation of Input Device

Figure 3:
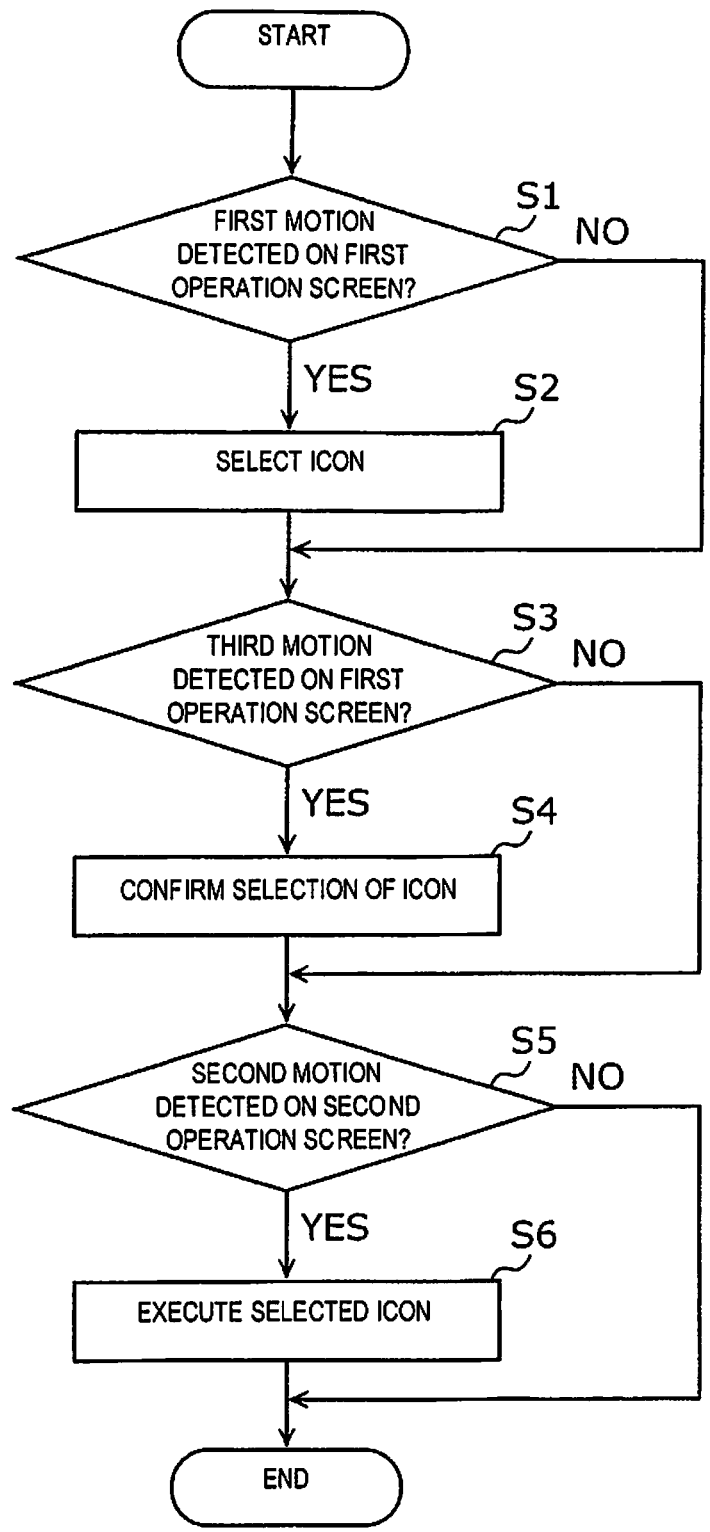
FIG. 3 is a flowchart showing the flow of operation of the input device pertaining to the first embodiment.

The operation of the input device 2 pertaining to the first embodiment will now be described through reference to FIGS. 3 and 4A to 4D. FIG. 3 is a flowchart showing the flow of operation of the input device 2 pertaining to the first embodiment. FIGS. 4A, 4B, 4C and 4D are diagrams showing the flow of operation of the input device 2 pertaining to the first embodiment.

As shown in FIGS. 4A to 4D, a screen that includes the icon 52 for starting up an application, the cursor 54, and so forth (such as an operation screen for an apparatus) is displayed in the spatial image 16. From this state, as shown in FIG. 4A, the user inserts the pointer 48 in the depth direction with respect to the first operation screen 22 in the imaginary plane 20. Then, the detector 49 senses the position of the pointer 48 on the first operation screen 22. Consequently, the display controller 51 moves the cursor 54 to the position of the pointer 48 on the first operation screen 22.

After this, as shown in FIG. 4B, the user slides the pointer 48 up, down, to the left, or to the right over the first operation screen 22 in a state of being inserted into the first operation screen 22. As a result, the detector 49 detects the first motion on the first operation screen 22. Consequently, the display controller 51 moves the cursor 54 up, down, left, or right so as to track the movement of the pointer 48, as the first operation.

After this, as shown in FIG. 4C, the user stops the movement of the pointer 48 over the icon 52, so that the cursor 54 is superposed over the icon 52, and the icon 52 is selected. At this point, the detector 49 detects the first motion on the first operation screen 22 (Yes in S1). Consequently, the display controller 51 selects the icon 52 as the first operation (S2).

In this state, the user pulls the pointer 48 out of the first operation screen 22, so that the cursor 54 is maintained in a state of being superposed over the icon 52. At this point, the detector 49 detects the third motion on the first operation screen 22 (Yes in S3). Consequently, the display controller 51 confirms the selection of the icon 52 as the third operation (S4). Thus, in the illustrated embodiment, the detector 49 is configured to execute the third operation in response to detecting the third motion after the display controller 51 executes the first operation.

After this, as shown in FIG. 4D, the user pushes in the pointer 48 in the depth direction with respect to the second operation screen 24 in the imaginary plane 20. As a result, the detector 49 detects the second motion on the second operation screen 24 (Yes in S5). Consequently, as a second operation, the display controller 51 executes the icon 52 over which the cursor 54 is superposed (that is, which has been selected) in a state in which the position of the cursor 54 is maintained (S6). Thus executing the icon 52 starts the application corresponding to the icon 52. Thus, in the illustrated embodiment, the detector 49 is configured to execute the second operation in response to detecting the second motion after the display controller 51 executes the third operation.

1-3. Effect

Next, the effect obtained with the input device 2 pertaining to the first embodiment will be described. As discussed above, the detected motion of the pointer 48 is different between the first operation screen 22 and the second operation screen 24. Consequently, when the pointer 48 is slid over the first operation screen 22, for example, even if the pointer 48 is moved in the depth direction unintentionally, the icon will not be executed against the wishes of the user. Therefore, operation is easier with the input device 2.

Second Embodiment 2-1. Configuration of Input Device

Figure 5:
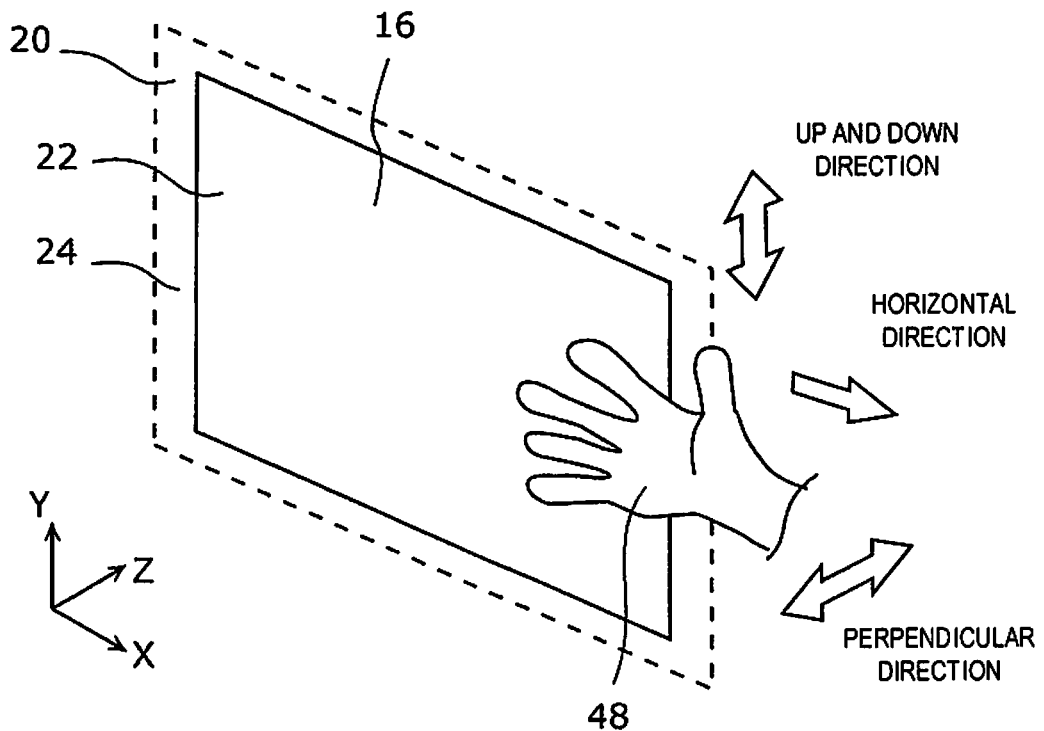
FIG. 5 is a diagram illustrating an fourth motion in the input device pertaining to the second embodiment.

The configuration of the input device 2A pertaining to a second embodiment will now be described through reference to FIGS. 1, 2, and 5. FIG. 5 is a diagram illustrating a fourth motion in the input device 2A pertaining to the second embodiment. In the various embodiments given below, those components that are the same as in the first embodiment above will be numbered the same and will not be described again.

As shown in FIGS. 1 and 2, with the input device 2A pertaining to the second embodiment, the detector 49A of the controller 12A detects the fourth motion in addition to the first to third motions described in the first embodiment above. That is, the detector 49A calculates information about the position of the pointer 48 (such as the user's whole hand) in the first operation screen 22 and the second operation screen 24. The detector 49A detects the fourth motion by the user based on this calculated position information. As shown in FIG. 5, the fourth motion is a motion in which the pointer 48 moves in the up and down direction (the positive or negative direction along the Y axis), the perpendicular direction (the positive or negative direction along the Z axis), and the horizontal direction (the positive or negative direction along the X axis), in a state of spanning the first operation screen 22 and the second operation screen 24 in the imaginary plane 20.

The display controller 51A of the controller 12A executes a fourth operation that is associated with the spatial image 16 when the detector 49A detects the fourth motion, in addition to the first operation, second operation, and third operation described in the first embodiment above. The fourth operation is an operation to move the page expressing the content application displayed in the spatial image 16 forward or backward.

Furthermore, the display controller 51A varies the amount by which the content page is moved according to the movement direction of the pointer 48 in the fourth motion. More specifically, when the movement direction of the pointer 48 in the fourth motion is the perpendicular direction (along the Z axis), then the display controller 51A moves the content page by a relatively large amount (such as three pages at a time), as a rough page movement. When the movement direction of the pointer 48 in the fourth motion is the up and down direction (along the Y axis), then the display controller 51A moves the content page by a relatively small amount (such as one page at a time), as a fine page movement. When the movement direction of the pointer 48 in the fourth motion is the horizontal direction (that is, when the pointer 48 moves away from the first operation screen 22 and the second operation screen 24 by moving horizontally) (along the X axis), then the display controller 51A preserves the currently displayed content page, without executing either fine or rough page movement.

2-2. Operation of Input Device

Figure 6:
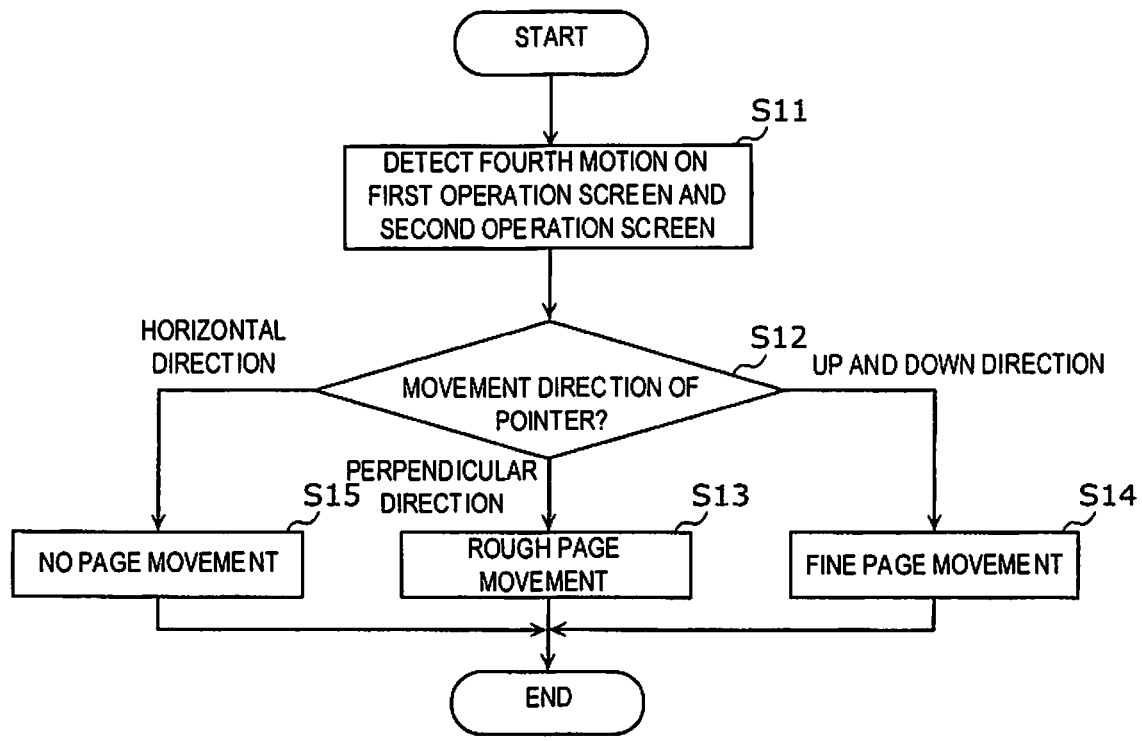
FIG. 6 is a flowchart showing the flow of operation of the input device pertaining to the second embodiment.

The operation of the input device 2A pertaining to the second embodiment will now be described through reference to FIGS. 6 and 7A to 7E. FIG. 6 is a flowchart showing the flow of operation of the input device 2A pertaining to the second embodiment. FIGS. 7A, 7B, 7C, 7D and 7E are diagrams showing the flow of operation of the input device 2A pertaining to the second embodiment.

Figure 7:
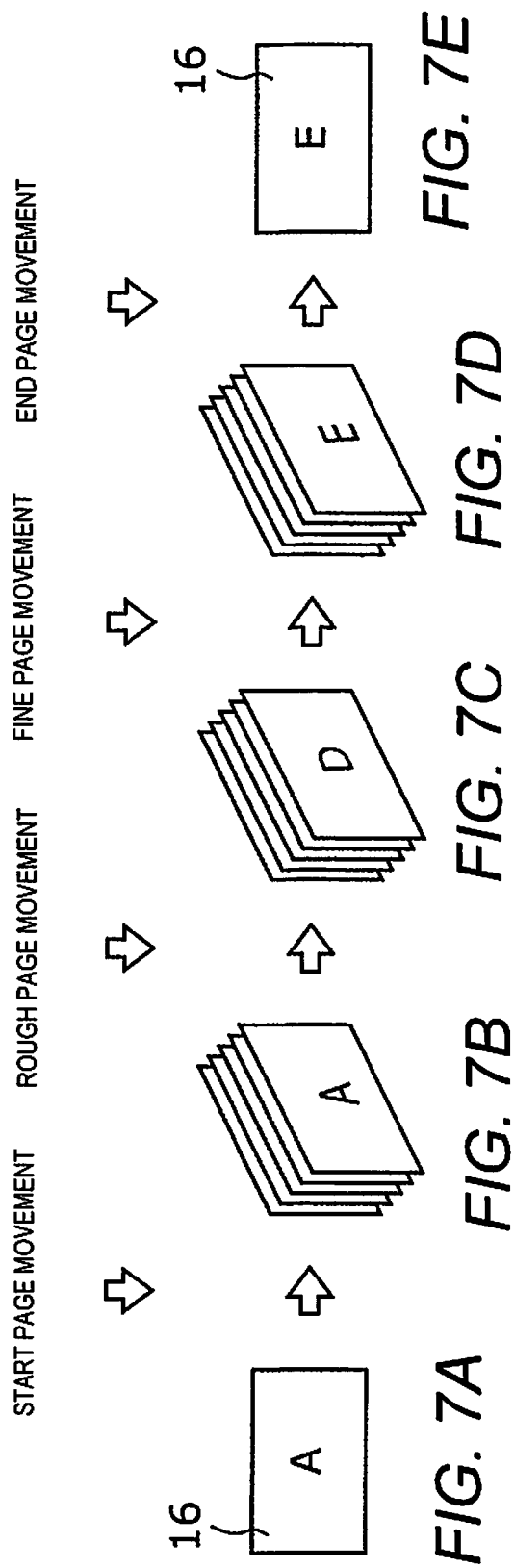
FIGS. 7A, 7B, 7C, 7D and 7E are diagrams showing the flow of the operation of the input device pertaining to the second embodiment.

As shown in FIGS. 7A to 7E, the content having five pages A to E, for example, that can be moved in order is displayed in the spatial image 16. In a state in which page A is displayed in the spatial image 16 as shown in FIG. 7A, the user places the pointer 48 so that it spans the first operation screen 22 and the second operation screen 24 in the imaginary plane 20. From this state, if the user moves the pointer 48 in a specific direction, then the detector 49A detects the fourth motion on the first operation screen 22 and the second operation screen 24 (S11).

When the movement direction of the pointer 48 in the fourth motion is the perpendicular direction (the perpendicular direction in S12), the display controller 51A executes the rough page movement (S13). Consequently, as shown in FIGS. 7B and 7C, for example, the page displayed on the spatial image 16 is moved by three pages from page A to page D. At this point the user can move the pointer 48 so as to pass through the imaginary plane 20 in the negative or positive direction along the Z axis (or from the positive direction to the negative direction along the Z axis). In other words, the detector 49A can detect the movement of the pointer 48 in the perpendicular direction by detecting the pointer 48 passing through or touching the first operation screen 22 and the second operation screen 24 along the Z axis. Of course, the input device 2A can be configured such that the detector 49A can detect the position of the pointer 48 along the Z axis, and such that the detector 49A detect the movement of the pointer 48 along the Z axis based on the detected portion of the pointer 48 along the Z axis.

Also, when the movement direction of the pointer 48 in the fourth motion is the up and down direction (the up and down direction in S12), the display controller 51A executes the fine page movement (S14). Consequently, as shown in FIGS. 7C and 7D, for example, the page displayed in the spatial image 16 is moved by one page from page D to page E.

Furthermore, when the movement direction of the pointer 48 in the fourth motion is the horizontal direction (the horizontal direction in S12), the display controller 51A does not execute either the rough page movement or the fine page movement (S15). Consequently, as shown in FIGS. 7D and 7E, for example, the page displayed in the spatial image 16 stays at page E, and the application corresponding to page E is started. After the fourth motion has been detected, the pointer 48 can be pushed into the first operation screen 22 or the second operation screen 24 to start up the application corresponding to page E.

2-3. Effect

Next, the effect obtained with the input device 2A pertaining to the second embodiment will be described. As discussed above, the user moves the pointer 48 in the perpendicular direction or the up and down direction until the desired page is displayed in the spatial image 16, which allows the rough or fine page movement to be performed. After this, the user moves the pointer 48 horizontally at the point when the desired page is displayed in the spatial image 16, so that the page displayed in the spatial image 16 stays at the desired page. This makes operation even easier with the input device 2A.

2-4. Modification Example

In the second embodiment, the display controller 51A varies the amount of content page movement according to the movement direction of the pointer 48 in the fourth motion. However, along with this, the order in which the pages are moved can also be varied. For example, if the movement direction of the pointer 48 in the fourth motion is the positive direction along the Y axis, the display controller 51A moves the content page in the order of page A→page B→page C→page D→page E. On the other hand, if the movement direction of the pointer 48 in the fourth motion is the negative direction along the Y axis, the display controller 51A moves the content page in the reverse order, that is, in the order of page E→page D→page C→page B→page A.

When the detector 49A detects the fourth motion, the display controller 51A executed an operation to move the content page displayed in the spatial image 16 as the fourth operation. However, this is not the only option. For example, when the detector 49A detects the fourth motion, the display controller 51A can execute an operation to zoom in on the content page displayed in the spatial image 16, as the fourth operation.

Third Embodiment 3-1. Configuration of Input Device

Figure 8:
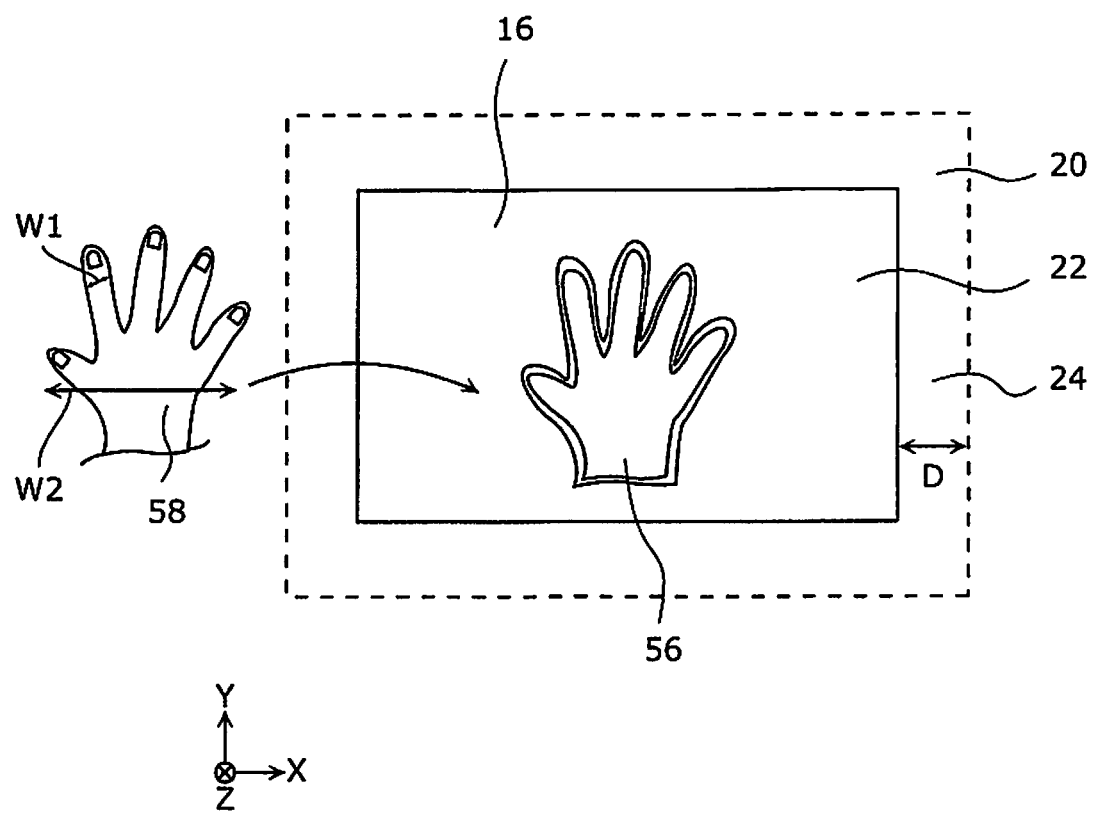
FIG. 8 is a diagram illustrating a calibration mode in the input device pertaining to the third embodiment.

The configuration of the input device 2B pertaining to a third embodiment will now be described through reference to FIGS. 1, 2, and 8. FIG. 8 is a diagram illustrating the calibration mode in the input device 2B pertaining to the third embodiment.

As shown in FIGS. 1 and 2, with the input device 2B pertaining to the third embodiment, in addition to the functions described in the first and second embodiments above, a calibration mode is executed to adjust the width D of the second operation screen 24. As shown in FIG. 8, in this calibration mode, a display controller 51B of a controller 12B displays a calibration image 56 in the spatial image 16. The calibration image 56 is in the shape of an open hand, for example. Thus, in the illustrated embodiment, the display panel 4 is configured to display the calibration image 56 for positioning the user's hand 58 on the imaginary plane 20.

The user places his open hand 58 over the calibration image 56. Then, the detector 49B of the controller 12B senses the size of this hand 58. Consequently, the display controller 51B adjusts the width D of the second operation screen 24 based on the sensed size of the hand 58. More specifically, the display controller 51B adjusts the width D of the second operation screen 24 to be greater than the thickness (width) W1 of one finger of the hand 58 (e.g., index finger, or other finger) and less than the overall size W2 of the hand 58 (e.g., span of the hand 58, such as the distance from the tip of the thumb to the tip of the little finger) (W1<D<W2). Thus, in the illustrated embodiment, the detector 49B is configured to sense the thickness (width) W1 of a finger of the hand 58 and the width W2 of the hand 58 as the size of the hand 58. The display controller 51B is configured to adjust the width D of the second operation screen 24 to be larger than the width W1 of the finger and smaller than the width W2 of the hand 58.

If the width D of the second operation screen 24 is less than the thickness W1 of one finger of the hand 58, then when an attempt is made to push in the second operation screen 24 with a finger of the user's hand 58 as described in the first embodiment above, there is the risk that the finger of the hand 58 will end up spanning the first operation screen 22 and the second operation screen 24. If this happens, the detector 49 will be unable to detect the second motion, and will end up mistakenly detecting the fourth motion.

Also, if the width D of the second operation screen 24 is greater than the overall size W2 of the hand 58, it will be difficult for the user to place the hand 58 so as to span the first operation screen 22 and the second operation screen 24 as described in the second embodiment.

3-2. Operation of Input Device

Figure 9:
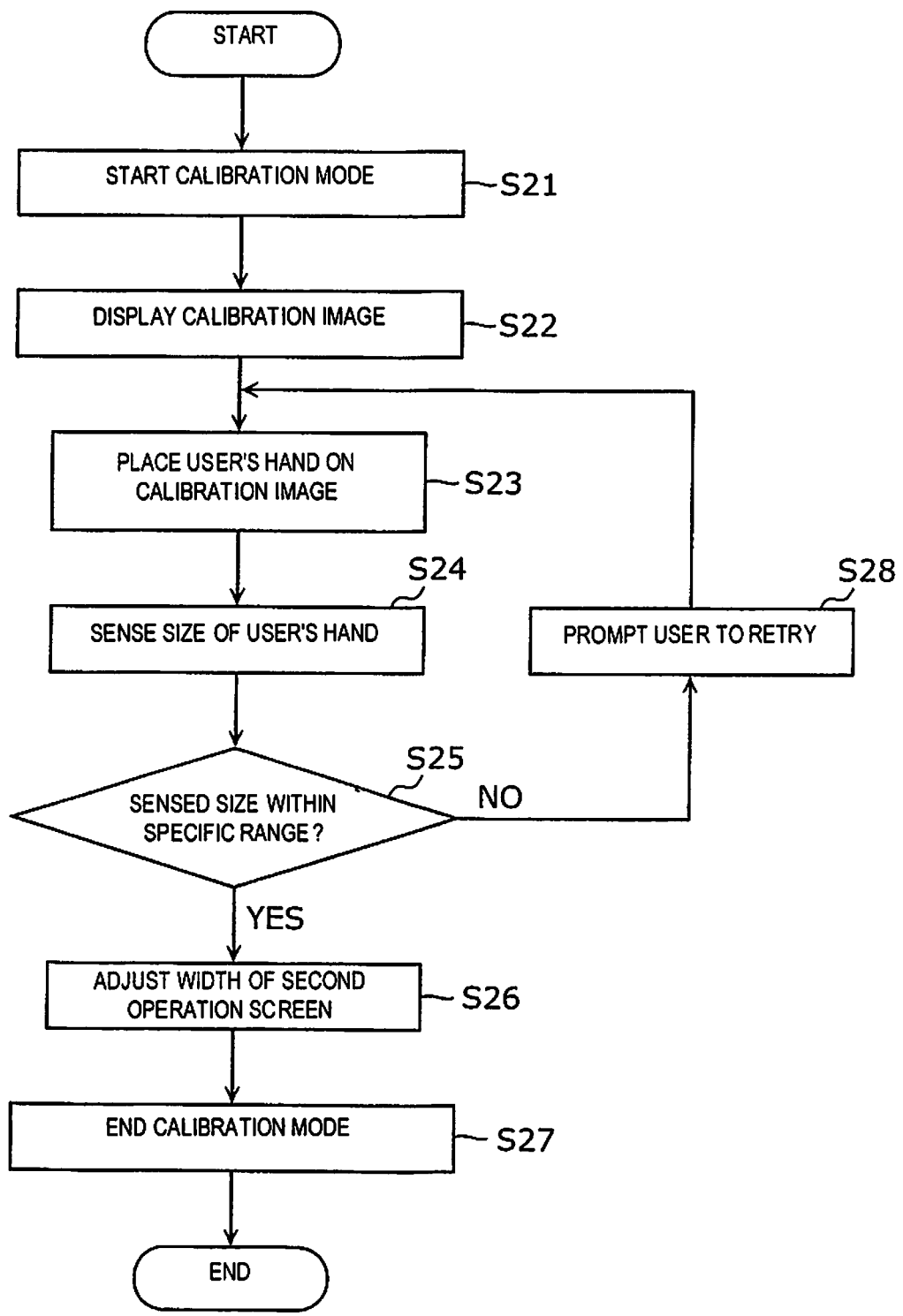
FIG. 9 is a flowchart showing the flow of operation of the input device pertaining to the third embodiment.

The operation of the input device 2B pertaining to the third embodiment will now be described through reference to FIG. 9. FIG. 9 is a flowchart showing the flow of operation of the input device 2B pertaining to the third embodiment.

When the calibration mode is started (S21), the calibration image 56 is displayed in the spatial image 16 (S22). After this, when the user places his open hand 58 over the calibration image 56 (S23), the detector 49B senses the size of this hand 58 (S24).

At this point, if the sensed size of the hand 58 is within a specific range (Yes in S25), the display controller 51B adjusts the width D of the second operation screen 24 based on the sensed size of the hand 58 (S26). The calibration mode is then ended (S27).

On the other hand, if the size of the hand 58 is not within the specified range (No in S25), the display controller 51B displays a message prompting the user to try again (such as a message of "Hold up hand again") in the spatial image 16 (S28). Consequently, the user once again places his hand over the calibration image 56 (S23). If the sensed size of the hand 58 is not within the specified range, this could mean that the user placed his closed hand 58 over the calibration image 56, or that something other than the hand 58 was placed over the calibration image 56, etc.

3-3. Effect

Next, the effect obtained with the input device 2B pertaining to the third embodiment will be described. Since the size of the hand 58 will vary from one user to the next, the width D of the second operation screen 24 can be adjusted according to the size of the user's hand 58 by executing the calibration mode discussed above. This minimizes erroneous operation with the input device 2B.

Fourth Embodiment

Figure 10:
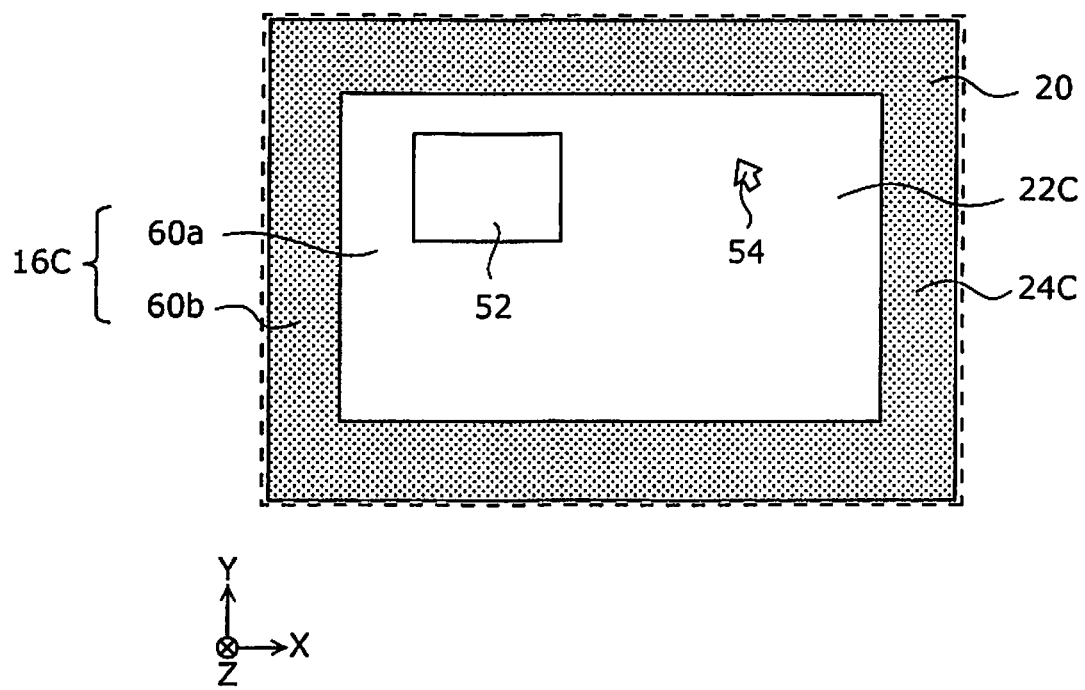
FIG. 10 is a diagram of a spatial image in the input device pertaining to the fourth embodiment.

The configuration of the input device 2C pertaining to a fourth embodiment will now be described through reference to FIGS. 1, 2, and 10. FIG. 10 is a diagram of a spatial image 16C in the input device 2C pertaining to the fourth embodiment.

As shown in FIG. 10, with the input device 2C pertaining to the fourth embodiment (see FIGS. 1 and 2), the spatial image 16C has a first image region 60a that is included in a first operation screen 22C, and a second image region 60b that is included in a second operation screen 24C. The first image region 60a is, for example, an image region in which is displayed content including the icon 52, the cursor 54, etc. (such as an operation screen for an apparatus). Meanwhile, the second image region 60b is a region in which no content is displayed, and is an image region in which only a black background is displayed, for example.

In the example shown in FIG. 10, the outline of the second operation screen 24C coincides with the outline of the spatial image 16C, and the boundary between the first operation screen 22C and the second operation screen 24C coincides with the boundary between the first image region 60a and the second image region 60b. In the illustrated embodiment, the imaginary plane 20 is defined as a plane on which the spatial image 16C is formed. The first operation screen 22C and second operation screen 24C are defined as a scanned region of the imaginary plane 20 over which the detection light 26 (see FIG. 1) scans or irradiates. Also, the first operation screen 22C is set as part of the scanned region, while the second operation screen 24C is set as part of the scanned region other than the first operation screen 22C. In particular, in the illustrated embodiment, the position of the outline of the second operation screen 24C is set to coincide with the position of the outline of the spatial image 16C. Specifically, in the illustrated embodiment, the first operation screen 22C coincides with the first image region 60a, while the second operation screen 24C coincides with the second image region 60b.

The same effect can be obtained with this configuration as with the first embodiment above.

Modification Examples

The input devices pertaining to the first to fourth embodiments of the present invention are described above. However, the present invention is not limited to or by these first to fourth embodiments. For instance, the above first to fourth embodiments can be combined with one another.

In the various embodiments above, the first motion, etc., is detected based on the timing at which the detection light 26 from the infrared laser element 28 is emitted, and the timing at which the reflected light 50 is received by the light receiver 10. However, this is not the only option. For example, the first motion, etc., can be detected based on the result of photographing the pointer 48 with a camera.

In the various embodiments above, the second operation screen 24 is disposed all the way around the first operation screen 22. However, this is not the only option. The second operation screen 24 can be disposed around just part of the outer periphery of the first operation screen 22 (such as only on the upper side of the first operation screen 22).

Also, in specific terms, the above-mentioned input device can be configured as a computer system made up of microprocessor, a ROM, a RAM, a hard disk drive, a display unit, a keyboard, a mouse, and so forth. Computer programs can be stored in the RAM or hard disk drive. The microprocessor operates according to a computer program, so that the input device performs its functions. The computer program here is made up of a combination of a plurality of command codes that give instructions to the computer to achieve a specific function.

Furthermore, some or all of the constituent elements that make up the above-mentioned input device can be made up of a single system LSI (large scale integration). This system LSI is a super-multifunctional LSI produced by integrating a plurality of structural portions onto a single chip. For example, this includes a computer system made up of a microprocessor, a ROM, a RAM, and so forth. The ROM in this case stores computer programs. The microprocessor operates according to a computer program, so that the system LSI achieves its functions.

Also, some or all of the constituent elements that make up the above-mentioned input device can be made up of an IC card that can be inserted into and removed from the input device, or a single module. The IC card or module is a computer system made up of a microprocessor, a ROM, a RAM, and so forth. The IC card or module can include the above-mentioned super multifunctional LSI. The microprocessor operates according to a computer program, so that the IC card or module achieves its functions. This IC card or module can by tamper resistant.

The present invention can also be the method described above. Also, the present invention can be a computer program with which these methods are carried out by a computer, or can be a digital signal formed of the above-mentioned computer program.

Further, the present invention can be a computer-readable, non-transitory recording medium, such as a flexible disk, a hard disk, a CD-ROM, an MO, a DVD, a DVD-ROM, a DVD-RAM, a BD (Blu-Ray™ Disc), a semiconductor memory, or the like on which the above-mentioned computer program or the above-mentioned digital signal is recorded. Also, the present invention can be the above-mentioned digital signal recorded to one of these non-transitory recording media.

Also, the present invention can transmit the above-mentioned computer program or digital signal over an electrical communication line, a wireless or wired communication line, a network such as the Internet, by data broadcasting, etc.

Also, the present invention can be a computer system including a microprocessor and a memory. The memory can store the above-mentioned computer programs, and the microprocessor can operate according to these computer programs.

Also, by transferring the program or the digital signal by recording it to a recording medium, or by transferring the program or the digital signal over a network or the like, the present invention can be implemented by another, independent computer system.

The present invention can be applied to an imaging device that is used as a VUI for operating an apparatus or the like, for example.

[1] In view of the state of the know technology and in accordance with a first aspect of the present invention, an input device is provided that comprises a display component, a detector, and a controller. The display component is configured to display an image. The detector is configured to detect a first motion and a second motion. In the first motion, a pointer is slid over a first operation screen that lies in an imaginary plane including at least part of a spatial image that is a virtual image of the image formed in space. In the second motion, the pointer is moved into a second operation screen that lies in the imaginary plane and is different from the first operation screen. The controller is configured to execute a first operation to select the image when the first motion is detected, and is configured to execute a second operation to execute content of the selected image when the second motion is detected.

With this aspect, the sensed motion of the pointer is different between the first operation screen and the second operation screen in the imaginary plane. Consequently, when the pointer is slid over the first operation screen, for example, even if the pointer is unintentionally moved in the depth direction (the direction of going through the imaginary plane), no operation will be executed against the wishes of the user. Therefore, operation is easier with this input device.

[2] In accordance with a preferred embodiment according to the input device mentioned above, the second operation screen is disposed along an entire periphery of the first operation screen.

With this aspect, the second operation screen is disposed all the way around the outside of the first operation screen, for example. Thus, the surface area of the second operation screen can be larger. This makes it easier to detect the second motion on the second operation screen.

[3] In accordance with a preferred embodiment according to any one of the input devices mentioned above, the first operation screen includes the spatial image entirely. The second operation screen is disposed outside of the spatial image.

With this aspect, the second operation screen is disposed on the outside of the spatial image, for example. Thus, the user can push in the pointer while aiming at the outside of the spatial image for performing the second motion.

[4] In accordance with a preferred embodiment according to any one of the input devices mentioned above, the spatial image has a first image region and a second image region. The first image region is included in the first operation screen and in which the image is displayed. The second image region is included in the second operation screen and in which the image is not displayed.

With this aspect, the spatial image has the first image region and the second image region. Thus, the user can push in the pointer while aiming at the second image region, in which no content is displayed, of the spatial image for performing the second motion.

[5] In accordance with a preferred embodiment according to any one of the input devices mentioned above, the detector is configured to detect a third motion in which the pointer moves away from the first operation screen. The controller is configured to execute a third operation to confirm selection of the image when the third motion is detected.

With this aspect, the selection of the image is confirmed when the pointer moves away from the first operation screen. After this, the user can use the pointer to select whether to operate on the first operation screen or the second operation screen.

[6] In accordance with a preferred embodiment according to any one of the input devices mentioned above, the detector is configured to detect a fourth motion in which the pointer moves in a specific direction in a state of spanning the first operation screen and the second operation screen. The controller is configured to execute a fourth operation associated with the spatial image when the fourth motion is detected.

With this aspect, the fourth motion is a motion in which the pointer moves in a specific direction in a state of spanning the first operation screen and the second operation screen. By contrast, the first motion is a motion in which the pointer is slid over the first operation screen, and the second motion is a motion in which the pointer is moved or pushed into the second operation screen. Thus, the regions in which the first motion, the second motion, and the fourth motion are detected are different from each other. Thus, when the fourth motion is performed, the first motion or the second motion is less likely to be detected mistakenly.

[7] In accordance with a preferred embodiment according to any one of the input devices mentioned above, the controller is configured to move pages of the image displayed in the spatial image as the fourth operation when the fourth motion is detected.

With this aspect, performing the fourth motion makes it easier to execute operation to move the pages of the image displayed in the spatial image.

[8] In accordance with a preferred embodiment according to any one of the input devices mentioned above, the controller is configured to vary an amount of the pages of the image that are moved according to a movement direction of the pointer.

With this aspect, the amount of the pages of the image that is moved varies according to the movement direction of the pointer. Thus, this is more convenient when moving the image page.

[9] In accordance with a preferred embodiment according to any one of the input devices mentioned above, the pointer is a hand. The detector is configured to sense the size of the hand disposed on the imaginary plane. The controller is configured to adjust a width of the second operation screen based on the sensed size of the hand.

With this aspect, the width of the second operation screen can be adjusted according to the size of the user's hand, for example. This makes it less likely that the input device will be operated by mistake.

[10] In accordance with a preferred embodiment according to any one of the input devices mentioned above, the controller is configured to move a cursor over the spatial image to track movement of the pointer as the first operation when the first motion is detected. The controller is configured to execute the content of the image on the spatial image over which the cursor is superposed as the second operation when the second motion is detected.

With this aspect, cursor movement and object selection can be performed by a relatively simple motion.

[11] In accordance with a preferred embodiment according to any one of the input devices mentioned above, the input device further comprises a light source unit and a light receiver. The light source unit is configured to scan over the first operation screen and the second operation screen with light. The light receiver is configured to receive the light reflected by the pointer.

[12] In accordance with a preferred embodiment according to any one of the input devices mentioned above, the light receiver is configured to receive the light reflected by the pointer while the pointer is located in the imaginary plane.

[13] In accordance with a preferred embodiment according to any one of the input devices mentioned above, the detector is configured to detect position of the pointer in the imaginary plane. The detector is configured to detect the first motion and the second motion based on the detected position of the pointer.

[14] In accordance with a preferred embodiment according to any one of the input devices mentioned above, the detector is configured to detect the position of the pointer in the imaginary plane based on a scanning position of the light source unit at a light receiving timing of the light receiver.

[15] In accordance with a preferred embodiment according to any one of the input devices mentioned above, the input device further comprises an optical element. The optical element is configured to form the spatial image of the displayed image displayed on the display component.

[16] In accordance with a preferred embodiment according to any one of the input devices mentioned above, the detector is configured to execute the third operation in response to detecting the third motion after the controller executes the first operation.

[17] In accordance with a preferred embodiment according to any one of the input devices mentioned above, the detector is configured to execute the second operation in response to detecting the second motion after the controller executes the third operation.

[18] In accordance with a preferred embodiment according to any one of the input devices mentioned above, the display component is configured to display a calibration image for positioning the hand on the imaginary plane.

[18] In accordance with a preferred embodiment according to any one of the input devices mentioned above, the detector is configured to sense a width of a finger of the hand and a width of the hand as the size of the hand. The controller is configured to adjust the width of the second operation screen to be larger than the width of the finger and smaller than the width of the hand.

[20] In accordance with a preferred embodiment according to any one of the input devices mentioned above, the detector is configured to detect position of the pointer in the imaginary plane. The detector is configured to detect the first motion and the second motion based on the detected position of the pointer.

In addition to being realized as an input device comprising a characteristic processor as above, the present invention can also be realized as an input method having a step of processing executed by a characteristic processor included in an input device. It can also be realized as a program for causing a computer to function as a characteristic processor included in an input device, or as a program for causing a computer to execute a characteristic step included in an input method. It should go without saying that a program such as this can be distributed via a non-transitory recording medium that can be read by a computer, such as a CD-ROM (compact disc-read only memory), or via the Internet or another such communication network.

The input device pertaining to an aspect of the present invention makes operation easier.

In understanding the scope of the present invention, the term "comprising" and its derivatives, as used herein, are intended to be open ended terms that specify the presence of the stated features, elements, components, groups, integers and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of an input device in an upright position. Accordingly, these directional terms, as utilized to describe the input device should be interpreted relative to an input device in an upright position on a horizontal surface. The terms "left" and "right" are used to indicate the "right" when referencing from the right side as viewed from the front (display side of the spatial image) of the input device, and the "left" when referencing from the left side as viewed from the front of the input device.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An input device comprising:
a display component that displays an image;
a detector that detects a first motion in which a pointer is slid across a first operation screen while the pointer is intersecting the first operation screen in a perpendicular direction and is moved onto a first image region of the first operation screen that corresponds to the image from a position of the first operation screen spaced apart from the first image region while the pointer is intersecting the first operation screen in the perpendicular direction, and a second motion in which the pointer that has been pulled out from the first operation screen in the perpendicular direction such that the pointer does not intersect the first operation screen in the perpendicular direction is pushed into a second operation screen in the perpendicular direction such that the pointer intersects the second operation screen in the perpendicular direction, the first operation screen lying in an imaginary plane including at least part of a spatial image that is a virtual image of the image formed in space, the second operation screen lying in the imaginary plane, the second operation screen being different from the first operation screen and spaced away from the first image region of the first operation screen; and a controller that executes a first operation to select the image in response to the first motion being detected, and executes a second operation to execute content of the selected image in response to the second motion being detected after the first motion is detected.

2. The input device according to claim 1, wherein the second operation screen is disposed along an entire periphery of the first operation screen.

3. The input device according to claim 1, wherein the first operation screen includes the spatial image entirely, and
the second operation screen is disposed outside of the spatial image.

4. The input device according to claim 1, wherein the spatial image has:
the first image region that is included in the first operation screen and in which the image is displayed; and
a second image region that is included in the second operation screen and in which the image is not displayed.

5. The input device according to claim 1, wherein the detector detects a third motion in which the pointer moves away from the first operation screen, and
the controller executes a third operation to confirm selection of the image when the third motion is detected.

6. The input device according to claim 5, wherein the detector executes the third operation in response to detecting the third motion after the controller executes the first operation.

7. The input device according to claim 5, wherein the detector executes the second operation in response to detecting the second motion after the controller executes the third operation.

8. The input device according to claim 1, wherein the detector detects a fourth motion in which the pointer moves in a specific direction in a state of spanning the first operation screen and the second operation screen, and
the controller executes a fourth operation associated with the spatial image when the fourth motion is detected.

9. The input device according to claim 8, wherein the controller moves pages of the image displayed in the spatial image as the fourth operation when the fourth motion is detected.

10. The input device according to claim 9, wherein the controller varies an amount of the pages of the image that are moved according to a movement direction of the pointer.

11. The input device according to claim 1, wherein the pointer is a hand,
the detector senses the size of the hand disposed on the imaginary plane, and
the controller adjusts a width of the second operation screen based on the sensed size of the hand.

12. The input device according to claim 11, wherein the display component displays a calibration image for positioning the hand on the imaginary plane.

13. The input device according to claim 11, wherein the detector senses a width of a finger of the hand and a width of the hand as the size of the hand, and
the controller adjusts the width of the second operation screen to be larger than the width of the finger and smaller than the width of the hand.

14. The input device according to claim 1, wherein the controller moves a cursor over the spatial image to track movement of the pointer as the first operation when the first motion is detected, and
the controller executes the content of the image on the spatial image over which the cursor is superposed as the second operation when the second motion is detected.

15. The input device according to claim 1, further comprising
a light source unit that scans over the first operation screen and the second operation screen with light, and
a light receiver that receives the light reflected by the pointer.

16. The input device according to claim 15, wherein the light receiver receives the light reflected by the pointer while the pointer is located in the imaginary plane.

17. The input device according to claim 15, wherein the detector detects position of the pointer in the imaginary plane, and
the detector detects the first motion and the second motion based on the detected position of the pointer.

18. The input device according to claim 15, wherein the detector detects the position of the pointer in the imaginary plane based on a scanning position of the light source unit at a light receiving timing of the light receiver.

19. The input device according to claim 1, further comprising
an optical element that forms the spatial image of the image displayed on the display component.

20. The input device according to claim 1, wherein the detector detects position of the pointer in the imaginary plane, and
the detector detects the first motion and the second motion based on the detected position of the pointer.

* * * * *